United States Patent [19]
Aoki et al.

[11] Patent Number: 5,859,761
[45] Date of Patent: Jan. 12, 1999

[54] ELECTRIC DOUBLE-LAYER CAPACITOR

[75] Inventors: Munekazu Aoki; Keitaro Katsu, both of Tokyo, Japan

[73] Assignee: NEC Corporation, Tokyo, Japan

[21] Appl. No.: 825,362

[22] Filed: Mar. 28, 1997

[30] Foreign Application Priority Data

Mar. 28, 1996 [JP] Japan ................................. 8-074085

[51] Int. Cl.⁶ .............................. H01G 9/00; H01G 9/02; B65D 51/16
[52] U.S. Cl. .......................... 361/502; 361/512; 361/521; 29/25.03
[58] Field of Search ..................... 361/502, 503, 361/512–516, 520, 521, 522, 528, 533, 532, 531, 517, 537, 534, 538, 540, 541; 29/25.03, 25.35; 427/129, 131, 132, 209, 210, 247

[56] References Cited

U.S. PATENT DOCUMENTS

| | | | |
|---|---|---|---|
| 3,652,902 | 3/1972 | Hart et al. ................................ | 361/502 |
| 4,023,079 | 5/1977 | Selover, Jr. et al. ..................... | 361/502 |
| 5,121,301 | 6/1992 | Kurabayashi et al. ................... | 361/502 |
| 5,172,307 | 12/1992 | Tabuchi et al. .......................... | 361/502 |
| 5,227,960 | 7/1993 | Kunishi et al. .......................... | 361/502 |
| 5,367,431 | 11/1994 | Kunishi et al. .......................... | 361/502 |
| 5,428,501 | 6/1995 | Bruder ..................................... | 361/535 |

FOREIGN PATENT DOCUMENTS

| | | |
|---|---|---|
| 4-72617 | 6/1992 | Japan . |
| 4-288361 | 10/1992 | Japan . |
| 7-31535 | 7/1995 | Japan . |

OTHER PUBLICATIONS

T. Saito, et al., "Development of High–Power Electric Double Layer Capacitors", *NEC Technical Journal*, vol. 47, No. 10, 1994, pp. 91–97.

*Primary Examiner*—Bot L. Ledynh
*Assistant Examiner*—Anthony Dinkins
*Attorney, Agent, or Firm*—Ostrolenk, Faber, Gerb & Soffen, LLP

[57] ABSTRACT

An electric double-layer capacitor is provided, which decreases the number of necessary components to improve the productivity of the capacitor. The capacitor includes at least one basic cell. Each of the at least one basic cell has (a) an insulative, tubular gasket having a tubular inner space and opening ends, (b) a pair of polarizable electrodes made of a solid activated-carbon, (c) a sheet-like, porous, non electron-conductive separator sandwiched between the pair of electrodes; and (d) a pair of conductive, sheet-like collectors placed to close the opening ends of the gasket. The pair of collectors are electrically connected to a pair of external terminals. The pair of electrodes and the separator are placed in the inner space of the gasket. The gasket is made of a thermoplastic resin and is formed by injection molding. The separator and the pair of electrodes are unified with the gasket. The unification of the separator and the pair of electrodes with the gasket is performed during the molding process of the gasket.

8 Claims, 11 Drawing Sheets

ELECTRIC DOUBLE-LAYER CAPACITOR

BACKGROUND OF THE INVENTION

1. Field of the Invention

The present invention relates to an electric double-layer capacitor and more particularly, to an electric double-layer capacitor having positive and negative polarizable electrodes each of which is made of a solid activated-carbon, and a fabrication method of the capacitor.

2. Description of the Prior Art

An electric double-layer capacitor is a capacitor utilizing an electric double-layer generated at an interface of a solid (i.e., a polarizable electrode) and an electrolyte solution. This capacitor has a feature that a large capacitance in the order of farad (F) is readily realized, due to the fact that the electric double-layer equivalent to a dielectric layer in a popular capacitor is approximately as small as a molecule diameter.

FIGS. 1, 2 and 3 show a conventional electric double-layer capacitor, which was disclosed in the NEC Technical Journal, Vol. 47, No. 10, pp. 91–97, issued by the NEC Corporation on Oct. 11, 1994.

As shown in FIG. 1, this conventional electric double-layer capacitor has a stacked structure comprised of four basic cells 130. The cells 130 are stacked in a direction perpendicular to the cells 130, and are electrically connected in series. Each of the basic cells 130 is a unit of stacking.

As shown in FIG. 1, each of the basic cells 130 is comprised of a pair of polarizable electrodes 101 onto which an electrolyte solution such as a water solution of sulfuric acid is absorbed, a non-electron-conductive, porous sheet-like separator 102 sandwiched between the pair of electrodes 101, an insulating tubular gasket 103 having a tubular inner space 103a in which the pair of electrodes 101 and the separator 102 are placed, and a pair of conductive sheet-like collectors 108 located on both sides of the gasket 103 to close its open ends, respectively.

As shown in FIG. 3, the gasket 103 has an opening 104 for supplying the electrolyte solution into the inside of the basic cell 130. The opening 104 is formed to penetrate the gasket 103 in a direction parallel to the gasket 103, and is sealed with a plug 118. The gasket 103 further has four circular holes 106 at its respective corners for inserting connection bolts 116 thereinto.

The pair of polarizable electrodes 101 are typically made of a solid activated-carbon. The pair of collectors 108 are made of, for example, a conductive rubber or plastic, the conductivity of which is achieved by mixing carbon powder into the rubber or plastic material. The separator 102 is made of, for example, a porous polyolefin-system plastic or glass fibers, and is non-electron-conductive and ion-permeable.

The pair of collectors 108 serve not only as terminal plates of the basic cell 130 but also as sealing members for the electrolyte solution together with the gasket 103.

The collectors 108 located between the adjacent two electrodes 101 are commonly used for the adjacent two basic cells 130, respectively.

A pair of external terminal plates 110 are attached onto the outermost collectors 108 of the stacked structure formed by the four basic cells 130, respectively. A pair of rubber plates 112 serving as spacers are attached onto the pair of external terminal plates 110, respectively. A pair of pressing plates 113 are attached onto the pair of rubber plates 112, respectively.

The connection bolts 116, which are made of a metal such as a stainless steel, are inserted into the stacked holes of the stacked gaskets 103, respectively. Nuts 117, which are made of a metal such as a stainless steel, are engaged with the screws formed at the both ends of the bolts 116 to press the stacked basic cells 130 along the rods 116, thereby holding or combining the four stacked basic cells 130 together.

Due to the applied pressure, the contact resistance across the adjacent basic cells 130 and that across the outermost basic cells 130 and the corresponding terminal plates 110 are kept to a mimimum.

Generally, the above basic cell 130 independently exhibits a charge-storage function, and as a result, the single cell 130 maybe used as an electric double-layer capacitor. In actuality, however, a plurality of the basic cells 130 are often connected in cascade to thereby constitute the stacked structure, as shown in FIG. 1. The purpose of this stacked structure is to provide sufficient dielectric strength against the supply voltage for the electronic circuit in which the electric double-layer capacitor is used.

Specifically, the dielectric strength for the basic cell 130, which serves as an electric double-layer capacitor of the single-cell structure, depends upon the electrolysis voltage for the solvent of the electrolyte solution. For example, with an electric double-layer capacitor using a water-soluble electrolyte such as a dilute water solution of sulfuric acid, the dielectric strength is approximately 1.0 V, which is equal to the electrolysis voltage for water. The dielectric strength as low as approximately 1.0 V is insufficient against the supply voltage of 5.0 V, for example, that is typically used for a semiconductor integrated circuit. Therefore, in this case, at least six basic cells 130 are connected in cascade to thereby increase the dielectric strength.

Next, the fabrication method for the electric double-layer capacitor as shown in FIG. 1 is explained below with reference to FIGS. 2 and 3.

FIG. 2 shows a partial cross-section of the electric double-layer capacitor as shown in FIG. 1 in the boundary area between an adjacent two of the basic cells 130. FIG. 3 shows a cross-sectional view along the line III—III in FIG. 2.

First, the polarizable electrodes 101 are prepared by a known method. As an example, the fabrication method of the activated-carbon/polyacen composite material as disclosed in the Non-Examined Patent Publication No. 4-288361 published in 1992 may be used. Also, the collectors 108 are prepared by a known method.

Then, as shown in FIG. 2, the two electrodes 101 are pressed and attached onto the both surfaces of each of collectors 108, respectively. Thus, one of the collectors 108 and two of the electrodes 101 are unified or combined together.

The porous separators 102 and the gasket 103 are prepared by know processes, respectively.

Next, the separator 102 is placed on the electrode 101 in the subassembly consisting of the collector 108 and the two electrodes 101, and then, the gasket 103 is placed around the subassembly, as shown in FIG. 2.

Further, another subassembly consisting of the collector 108 and the two electrodes 101 is placed on the underlying separator 108. Thus, this cycle of operations is repeated as necessary, thereby forming the stacked structure.

Subsequently, as shown in FIG. 1, the terminal plates 110, the rubber plates 112, and the pressing plates 113 for uniform application of the pressure are applied to both ends of the stacked structure. Using the bolts 116 and nuts 117, the assembly thus formed is then held together under application of pressure.

Finally, the dilute sulfuric acid as the electrolyte solution is poured into the inside of the basic cells 130 through the corresponding openings 104 of the respective gaskets 103, thereby impregnating the activated-carbon electrodes 101 with the electrolyte solution by an impregnation method such as the vacuum impregnation method. Then, the openings 104 are plugged with the sealing plugs 118. Thus, the electric double-layer capacitor of the stacked structure shown in FIG. 1 is finished.

As seen from the above description, with the conventional electric double-layer capacitor of FIG. 1, the basic cell 130 is the unit of this capacitor from the viewpoint of charge storage function. On the other hand, from the viewpoint of fabrication method, a unit cell shown in FIG. 2, which is comprised of the collector 108 and the two electrodes 101 attached onto the corresponding surfaces of the collector 108, is a unit of this capacitor.

In other words, the functional repetition unit 130 and the fabricating repetition unit 131 are displaced from each other. Hereafter, the functional repetition unit may be called the "basic cell", or as necessary, the "functional basic cell", and the fabricating repetition unit may be called the "unit cell", or as needed, the "fabricating unit cell".

With the conventional electric double-layer capacitor shown in FIGS. 1, 2, and 3, the components required for fabrication are separately and individually provided, except for the subassembly comprised of the collector 108 and the two electrodes 101 that are previously integrated or unified. The problem with such conventional capacitors is that many assembly steps are required for the stacking process.

To solve the problem relating to the assembly processes, an improved technique was developed and disclosed in the Japanese Examined utility-Model Publication No. 7-31535 published in 1995. In this technique, the gasket of the electric double-layer capacitor is formed by injection molding of a thermoplastic resin. Further, the collector and the gasket are previously integrated or unified together during the injection-molding process for the gasket. Thus, the bonding strength is enhanced and the assembling operation is simplified.

With the conventional electric double-layer capacitor as shown in FIG. 1, no venting means is provided for any of the "functional electric basic cells 130". Therefore, there is the possibility that some cause such as generation of gas due to the electrolysis of the electrolyte solvent increases the internal pressure within the basic cells 130, thereby degrading the Equivalent Series Resistance (ESR). As a result, the basic cells 130 may burst, thereby destroying the charge storage capability as a capacitor. In a worst case scenario, the electrolyte solution is leaked from the basic cells 130 to thereby damage other electronic components.

To solve these problems, taking measures such measure as providing a venting valve in the "functional basic cell 130" is effective. An example of the electric double-layer capacitors having such the venting means was disclosed in the Japanese Non-Examined Utility-Model Publication No. 4-72617 published in 1992.

With the conventional electric double-layer capacitor as disclosed in the Japanese Non-Examined Utility-Model Publication No. 4-72617, a venting valve is provided for at least one of the stacked basic cells, and a water-repellingporous film, which does not pass the electrolyte solution but allows the gas existing in the cells to permeate through the film, is provided in a part of the intermediate collectors located between the adjacent basic cells. The gas generated in any one of the basic cells is released to the outside through the water-repelling porous film.

As described above, the conventional electric double-layer capacitor as shown in FIGS. 1, 2,and 3 has the problem that the components constituting the capacitor are each separate, and a lot of assembly processes are required to make the stacked structure. To solve this problem, the conventional electric double-layer capacitor disclosed in the Japanese Examined Utility-Model Publication No. 7-72617, provides a gasket integrally molded around the collector during the injection molding process of the thermoplastic resin, thereby decreasing the number of the necessary components. However, in this case, only two components, i.e., the collector and the gasket are integrated into one, and consequently, the effects of the reduction of the number of components and the simplification of the assembling operation cannot be said to be sufficient.

Further, the electric double-layer capacitor is also required to have a high reliability and a high safety as any other electronic components. Thus, with the conventional electric double-layer capacitor as disclosed in the Japanese Examined Utility-Model Publication No. 4-72617, a venting valve is provided for at least one of the stacked basic cells, and a water-repelling porous film is provided in a part of the intermediate collector located between basic cells, thereby allowing the gas generated in the cells to be released to the outside.

However, with the conventional capacitor disclosed in the Japanese Examined Utility-Model Publication No. 4-72617, because the direct connection between the inside of the basic cell and the outside thereof is realized by the venting valve, not only the gas but also the electrolyte solution tends to leak from the inside of the cells through this venting valve.

Fluoroplastics such as the polytetrafluoroethylene, which is the material to be used for the venting valve, are difficult to adhere to other engineering plastics. It is thus, a problem that the venting valve lacks reliability in such a configuration.

SUMMARY OF THE INVENTION

Accordingly, an object of the present invention is to provide an electric double-layer capacitor that decreases the number of necessary components to thereby improve the productivity, and a fabrication method of the capacitor.

Another object of the present invention is to provide an electric double-layer capacitor that is able to release the gas generated in the capacitor to the outside without leakage of the electrolyte solution, and a fabrication method of the capacitor.

A further object of the present invention is to provide an electric double-layer capacitor that is high in reliability and safety, and a fabrication method of the capacitor.

The objects together with others not specifically mentioned will become clear to those skilled in the art from the following description.

According to a first aspect of the present invention, an electric double-layer capacitor is provided.

The capacitor according to the first aspect includes at least one basic cell and a pair of external terminals electrically connected to the at least one cell.

Each of the at least one basic cell has (a) a tubular gasket having a tubular inner space and open ends, (b) a pair of polarizable electrodes onto which an electrolyte solution is absorbed; (c) a sheet-like separator sandwiched between the pair of electrodes; and (d) a pair of sheet-like collectors placed to close the opening ends of the gasket, respectively.

The gasket is made of an insulative material.

The pair of electrodes are made of a solid activated-carbon. Each of the pair of electrodes has an inner surface and an outer surface.

The separator is made of a porous, non electron-conductive material. The separator has first and second surfaces contacted with the opposing inner surfaces of the pair of electrodes.

The pair of collectors are made of a conductive material. The pair of collectors have inner surfaces contacted with the opposing outer surfaces of the pair of electrodes, respectively. The pair of collectors are electrically connected to the pair of external terminals.

The pair of electrodes and the separator are placed in the inner space of the gasket.

The gasket is made of a thermoplastic resin and is formed by injection molding. The separator and the pair of electrodes are unified with the gasket. The unification of the separator and the pair of electrodes with the gasket is performed during the molding process of the gasket.

With the electric double-layer capacitor according to the first aspect of the invention, the gasket is made of a thermoplastic resin and is formed by injection molding, thereby unifying the separator and the pair of electrodes with the gasket during the molding or forming process of the gasket. This means that the four components of the gasket, the separator, and the pair of electrodes are unified together. Therefore, the number of necessary components is decreased.

The decreased number of the necessary components leads to the number of the assembly processes, resulting in improvement in productivity.

In a preferred embodiment of the capacitor according to the first aspect, the pair of electrodes have tapered edges formed in such a way that the inner surfaces of the pair of electrodes are wider than the outer surfaces thereof, respectively.

In this case, an additional advantage is realized in that the contact resistance between the separator and the pair of electrodes are decreased, because the separator and the pair of electrodes are pressed by the opposing, inner surface of the gasket.

In another preferred embodiment of the capacitor according to the first aspect, the gasket has an opening formed to communicate the inner space of the gasket with the outside thereof. The opening serves as a path for venting a gas existing in the inner space of the gasket. The opening is sealed by a porous plug that allows the gas to be vented through the plug and prevents the electrolyte solution in the inner space from leaking.

In this case, an additional advantage is realized in that the gas generated in the capacitor can be released to the outside without leakage of the electrolyte solution.

In still another preferred embodiment of the capacitor according to the first aspect, the plug is formed in the opening to thereby close the opening during the molding process of the gasket. The plug is thus unified with the gasket.

In this case, an additional advantage is provided in that the plug is strongly adhered to the gasket, because the molten thermoplastic resin flows into the small pores of the plug during the molding process and is then cured.

According to a second aspect of the present invention, another electric double-layer capacitor is provided.

The capacitor according to the second aspect includes at least one basic cell and a pair of external terminals electrically connected to the at least one basic cell.

Each of the at least one basic cell is formed by a half of a first unit cell and a half of a second unit cell. The first and second unit cells are stacked to be adjacent to each other.

Each of the first and second unit cells has (a) a tubular gasket having a tubular inner space and open ends; (b) a sheet-like collector fixed to the gasket in the inner space of the gasket in such a way that the inner space is divided into two parts; (c) a pair of polarizable electrodes onto which an electrolyte solution is absorbed;

The gasket is made of an insulative material.

The collector is made of a conductive material. The collector has first and second surfaces located at opposite sides, respectively.

The pair of electrodes are located in the two parts of the inner space, respectively. The pair of electrodes have inner surfaces contacted with the first and second surfaces of the collector, respectively. The pair of electrodes are made of a solid activated-carbon.

The gasket is made of a thermoplastic resin and is formed by injection molding. The collector and the pair of electrodes are unified with the gasket. The unification of the collector and the pair of electrodes with the gasket is performed during the molding process of the gasket.

The first and second unit cells are stacked to be connected in cascade to each other through a sheet-like separator made of a porous, non electron-conductive material.

The separator is sandwiched between opposing two ones of the pairs of electrodes in the first and second unit cells. The separator has first and second surfaces at opposite sides that are contacted with opposing outer surfaces of the pairs of electrodes in the first and second unit cells, respectively.

With the electric double-layer capacitor according to the second aspect of the invention, the gasket is made of a thermoplastic resin and is formed by injection molding, thereby unifying the collector and the pair of electrodes with the gasket during the molding or forming process of the gasket. This means that the four components of the gasket i.e., the collector, and the pair of electrodes are unified together. Therefore, the number of necessary components is decreased.

The decreased number of the necessary components leads to the decreased number of the assembly process steps, resulting in improvement in productivity.

In a preferred embodiment of the capacitor according to the second aspect, the pair of electrodes have tapered side faces formed in such a way that the inner surfaces of the pair of electrodes are wider than the outer surfaces thereof, respectively.

In this case, an additional advantage that the contact resistance between the collector and the pair of electrodes are decreased, because the collector and the pair of electrodes are pressed by the opposing, inner surface of the gasket.

In another preferred embodiment of the capacitor according to the second aspect, the gasket has an opening formed to communicate the inner space of the gasket with the outside thereof. The opening serves as a path for venting a gas existing in the inner space of the gasket. The opening is sealed by a porous plug that allows the gas to be vented through the plug and prevents the electrolyte solution in the inner space from leaking.

In this case, an additional advantage is achieved in that the gas generated in the capacitor can be released to the outside without leakage of the electrolyte solution.

In still another preferred embodiment of the capacitor according to the second aspect, the plug is formed in the opening to thereby close the opening during the molding process of the gasket. The plug is unified with the gasket.

In this case, an additional advantage is provided in that the plug is strongly adhered to the gasket, because the molten thermoplastic resin flows into the small pores of the plug during the molding process and is then cured.

According to a third aspect of the present invention, a fabrication method of the electric double-layer capacitor according to the first aspect is provided.

The method is comprised of the following steps:

(a) A pair of polarizable electrodes onto which an electrolyte solution absorbed are prepared. The pair of electrodes are made of a solid activated-carbon. Each of the pair of electrodes has an inner surface and an outer surface.

(b) A sheet-like separator made of a porous, non electron-conductive material is prepared. The separator has first and second surfaces on opposite sides.

(c) A mold for injection molding is prepared. The mold has a molding space.

(d) The pair of electrodes and the separator are placed in the mold in such a way that the separator is sandwiched between the pair of electrodes. The first and second surfaces of the separator are contacted with the opposing inner surfaces of the pair of electrodes, respectively.

(e) An insulative, thermoplastic resin is injected into the molding space of the mold, thereby forming a tubular gasket having a tubular inner space and open ends by injection molding. The pair of electrodes and the separator are located in the inner space of the gasket. The separator and the pair of electrodes are unified with the gasket.

(f) A pair of sheet-like collectors made of a conductive material are prepared.

(g) The pair of collectors are placed in such a way that the inner surfaces of the pair of collectors are contacted with the opposing outer surfaces of the pair of electrodes, respectively. The pair of collectors are contacted with the gasket, respectively.

With the fabrication method according to the third aspect of the present invention, the electric double-layer capacitor according to the first aspect can be fabricated.

According to a fourth aspect of the present invention, a fabrication method of the electric double-layer capacitor according to the second aspect is provided.

The method is comprised of the following steps:

(a) A pair of polarizable electrodes onto which an electrolyte solution is absorbed are prepared. The pair of electrodes are made of a solid activated-carbon. Each of the pair of electrodes has an inner surface and an outer surface.

(b) A sheet-like collector made of a conductive material is prepared. The collector has first and second surface at opposite sides.

(c) A mold for injection molding is prepared. The mold has a molding space.

(d) The pair of electrodes and the collector are placed in the mold in such a way that the collector is sandwiched between the pair of electrodes. The first and second surfaces of the collector are contacted with the opposing inner surfaces of the pair of electrodes, respectively.

(e) An insulative, thermoplastic resin is injected into the molding space of the mold, thereby forming a tubular gasket having a tubular inner space and open ends by injection molding. The pair of electrodes and the collector are located in the inner space of the gasket. The collector and the pair of electrodes are unified with the gasket.

(f) A pair of sheet-like separators made of a porous, non electron-conductive material are prepared.

(g) The pair of separators are placed in such a way that the inner surfaces of the pair of separators are contacted with the opposing outer surfaces of the pair of electrodes, respectively. The pair of separators are contacted with the gasket.

With the fabrication method according to the fourth aspect of the present invention, the electric double-layer capacitor according to the second aspect can be fabricated.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Figure 1:
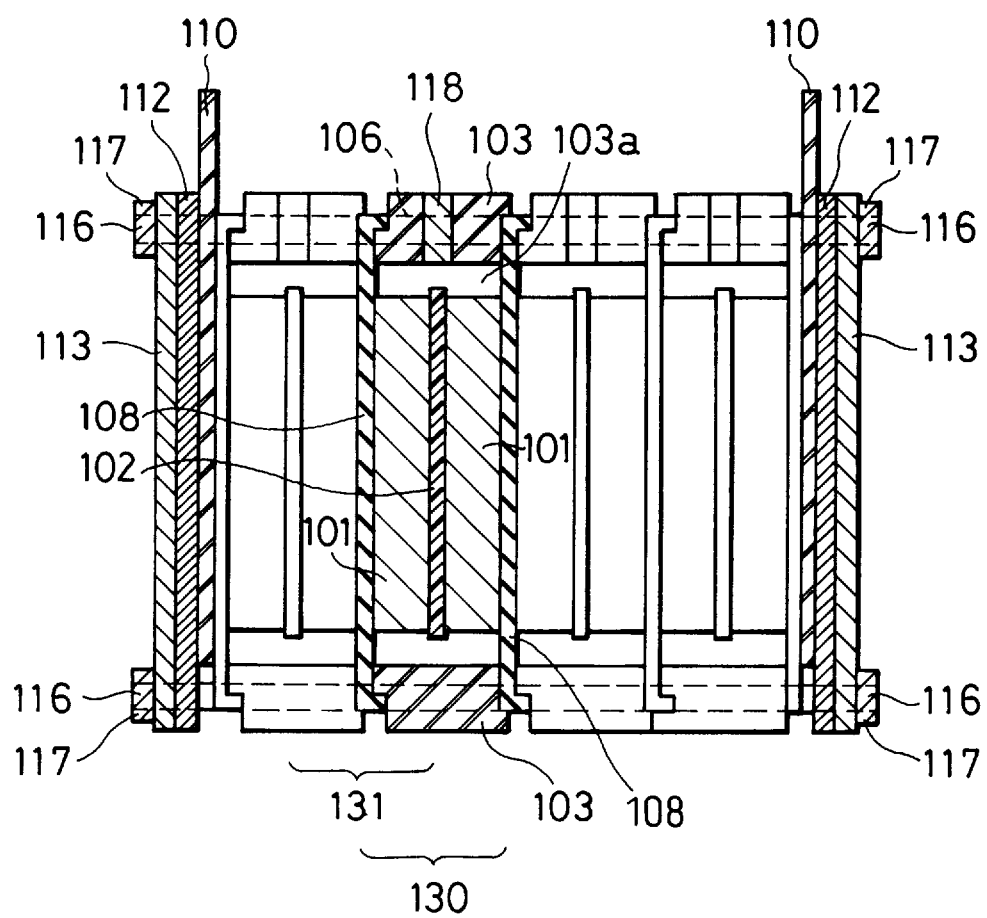
FIG. 1 is a vertical, cross-sectional view of a conventional electric double-layer capacitor with the stacked structure of basic cells.
Figure 2:
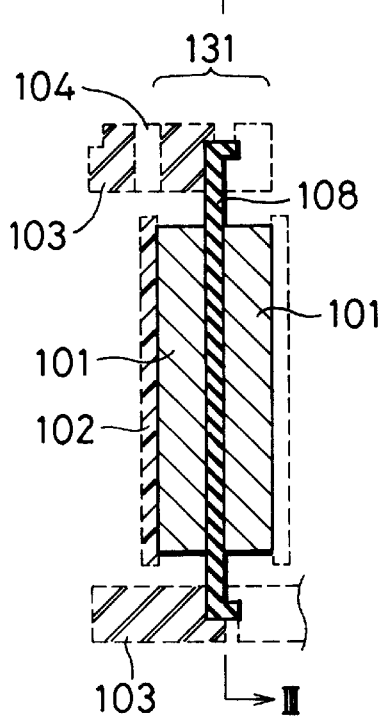
FIG. 2 is a partial, vertical, cross-sectional view of the conventional electric double-layer capacitor of FIG. 1, which shows a fabrication process step of the capacitor.
Figure 3:
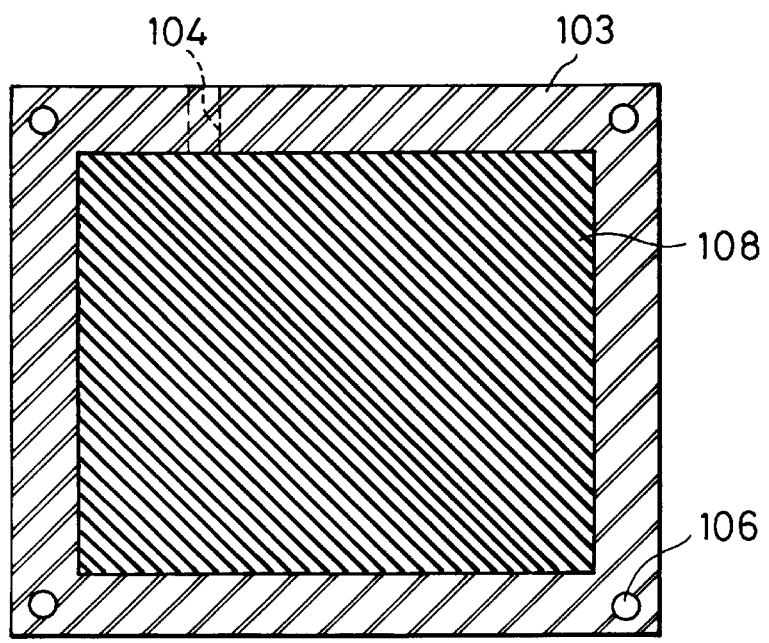
FIG. 3 is a lateral, cross-sectional view along the line III—III in FIG. 2.

Preferred embodiments of the present invention will be described in detail below while referring to the drawings attached.

FIRST EMBODIMENT

Figure 4:
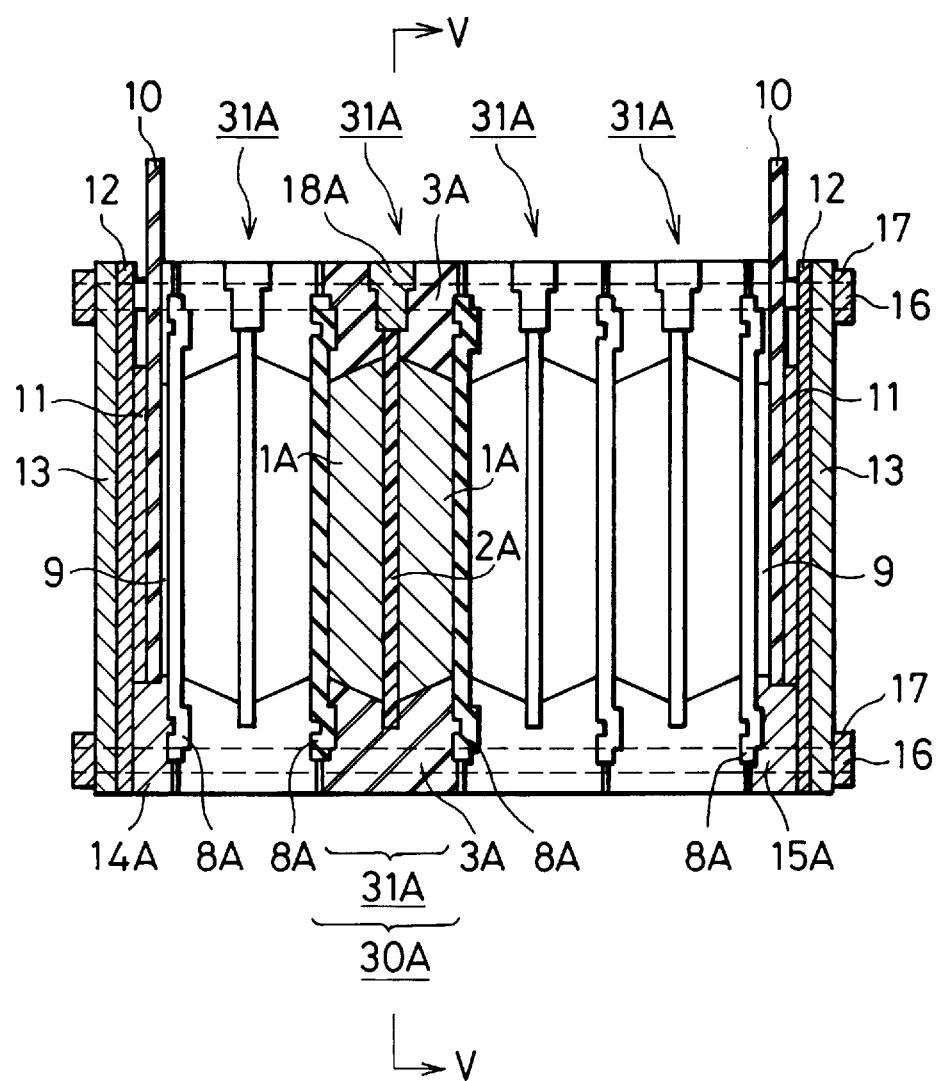
FIG. 4 is a vertical, cross-sectional view of an electric double-layer capacitor with the stacked structure of basic cells according to a first embodiment of the invention.
Figure 5:
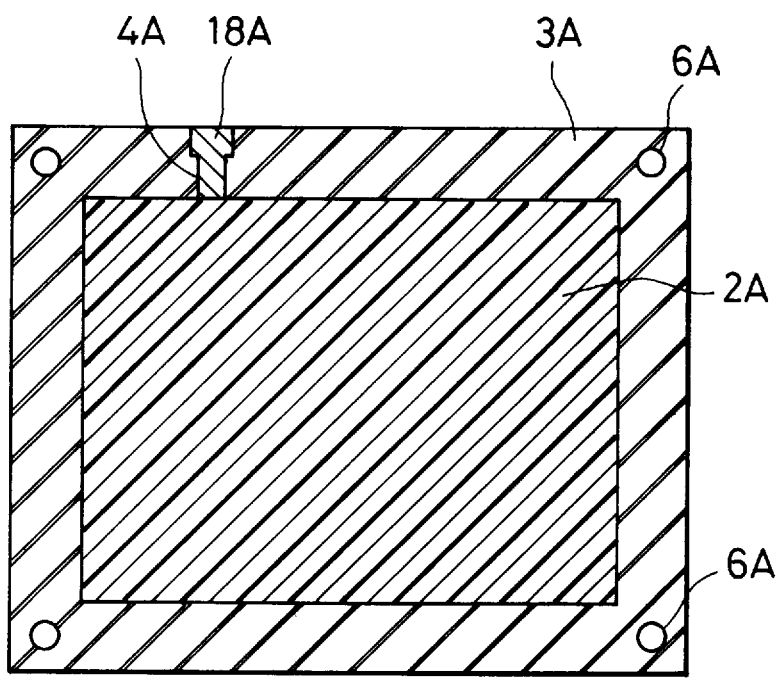
FIG. 5 is a lateral, cross-sectional view along the line V—V in FIG. 4.

As shown in FIGS. 4 and 5, an electric double-layer capacitor according to a first embodiment of the invention has a stacked structure comprised of four "functional basic cells 30A". The cells 30A are stacked in a direction perpendicular to the cells 30A, and are electrically connected in cascade. Each of the basic cells 30A is a unit of stacking.

As shown in FIG. 4, each of the basic cells 30A is comprised of a pair of polarizable electrodes 1A onto which a water solution of sulfuric acid as an electrolyte solution is absorbed, a non-electron-conductive, porous sheet-like separator 2A sandwiched between the pair of electrodes 1A, an insulating tubular gasket 3A having a tubular inner space in which the pair of electrodes 1A and the separator 2A are placed, and a pair of conductive sheet-like collectors 8A located to close the opening ends of the gasket 3A, respectively.

As shown in FIG. 5, the gasket 3A has an opening 4A for supplying the electrolyte solution into the inside of the "functional basic cell 30A". The opening 4A is formed to penetrate the gasket 3A in a direction parallel to the gasket 3A, and is sealed with a plug 18A to prevent the electrolyte solution from leaking. The gasket 3A further has four circular holes 6A at its respective corners for inserting connection bolts 16 thereinto.

The pair of polarizable electrodes 1A are made of a solid activated-carbon/polyacen composite material. The pair of collectors 8A are made of a conducive butyl rubber, the conductivity of which is given by mixing carbon powder and others into the butyl rubber material. The separator 2A is made of porous glass fibers used for a lead-acid battery, which is non-electron-conductive and ion-permeable.

The pair of collectors 8A serve not only as terminal plates of the basic cell 30A but also as sealing members for the electrolyte solution together with the gasket 3A.

The collectors 8A located between the adjacent two electrodes 1A are commonly used for the adjacent two basic cells 30A, respectively.

A pair of external terminal plates 10 are attached onto the outermost collectors 8A at the positive- and negative-side ends of the stacked structure formed by the four basic cells 30A, respectively. The pair of terminal plates 10 are made of solder-plated aluminum, respectively. Since the outer most collectors 8A have Grafoils 9 bonded onto their outer surfaces, respectively, the terminal plates 10 are contacted with the corresponding Grafoils 9, respectively.

A positive-side end tubular gasket frame 14A and a negative-side end tubular gasket frame 15B, which are made of ABS resin, were bonded onto the positive- and negative-side ends of the stacked structure, respectively.

A pair of butyl-rubber plates 11 serving as spacers are attached onto the pair of external terminal plates 10 in the gasket frames 14A and 15B, respectively. A pair of butyl-rubber plates 12 serving as spacers are attached onto the pair of external terminal plates 10 and the gasket frames 14A and 15B, respectively. A pair of pressing plates 13 made of aluminum are attached onto the pair of butyl-rubber plates 12, respectively.

The connection bolts 16, which are made of a stainless steel, are inserted into the stacked holes 6A of the stacked gaskets 3A, respectively. Nuts 17, which are made of a stainless steel, are engaged with the screws formed at the both ends of the bolts 16 to press the stacked basic cells 30A along the bolts 16, thereby holding or combining the four stacked basic cells 30A together.

Due to the applied pressure, the contact resistance across the adjacent basic cells 30A and that across the outermost basic cells 30A and the corresponding terminal plates 10 are kept low.

The capacitor according to the first embodiment of FIG. 4 is different from the conventional capacitor of FIG. 1 in the following.

(1) The outer end of the separator 2A is inserted into the gasket 3A.
(2) The pair of electrodes 1A and the gasket 3A are directly contacted with each other, and no space or gap is formed between the outer surfaces of the electrodes 1A and the opposing inner surface of the gasket 3A.
(3) Each of the electrodes 1A has a tapered shape, and the sectional geometry is a trapezoid that has a wider base on the side of the separator 2A and a narrower one on the side of the collector 8A. In other words, the inner surface of each electrode 1A is wider than the outer surface thereof.
(4) The "functional base cell 30A" is substantially identical with the "fabricating unit cell 31A".

The electric double-layer capacitor according to the first embodiment of FIG. 4 is fabricated by the following process sequence:

First, the pair of polarizable electrodes 1A are produced. In this process, a powdered activated-carbon is mixed with a binder material such as a phenolic resin, and sintered the mixture to the block with the trapezoidal cross-section as described above. The process is based on the fabrication method for the activated-carbon/polyacen composite material as disclosed in the Japanese Non Examined patent Publication No. 4-288361. The binder material and the fabrication method are not limited thereto, if the activated-carbon electrode thus obtained is porous and block-shaped.

Next, as the porous separator 2A, a separator made of glass fibers used for a lead-acid battery is prepared. The material for the separator 2A is not limited thereto, if it is non-electron conductive and ion-permeable.

Figure 6A:
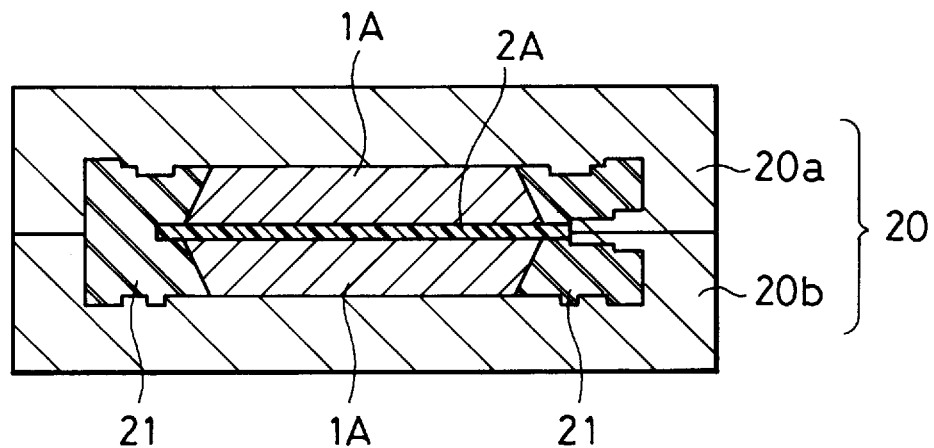
FIGS. 6A to 6C are vertical, cross-sectional views showing the fabrication process steps of the capacitor according to the first embodiment of FIG. 4, respectively.

Thereafter, as shown in FIG. 6A, the pair of electrodes 1A and the separator 2A are placed in the central portion of the bottom half 20b of an injection mold 20 in such a way that the pair of electrodes 1A are located on each side of the separator 2A. The relatively wider surfaces of the pair of electrodes 1A are contacted with the opposing surfaces of the separator 2A, respectively. Then, the top half 20a of the mold 20 is placed on the bottom one 20b. Thus, the pair of electrodes 1A and the separator 2A are included in the molding space of the mold 20.

Next, as shown in FIG. 6A, a molten Acrylonitrile-Butadiene-Styrene (ABS) resin is injected into the molding space of the mold 20, thereby filling the peripheral part around the pair of electrodes 1A. The injected molten ABS resin 21 is cured through a subsequent cooling process, thereby forming the tubular gasket 3A surrounding the electrodes 1A and the separator 2A.

Figure 6B:
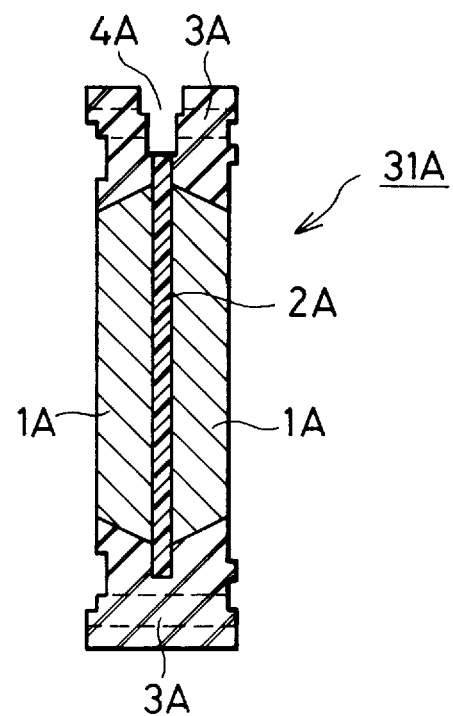
Figure 6C:
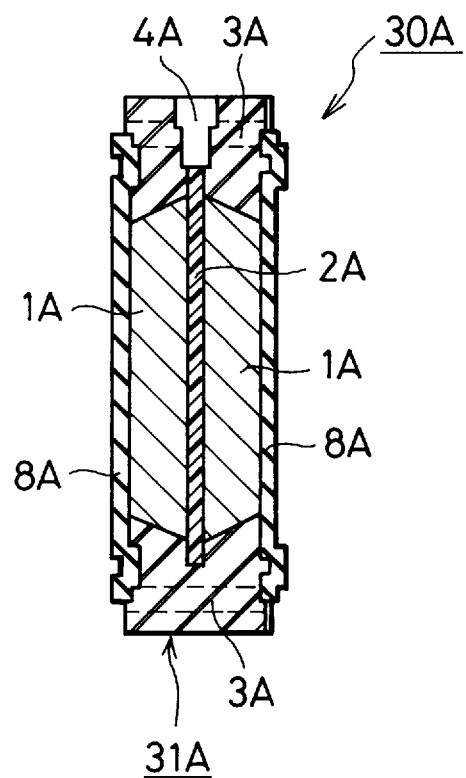

Thus, the "fabricating unit cell 31A", which is formed by four unified or combined components, i.e., the separator 2A, the two electrodes, and the gasket 3A, is obtained as shown in FIG. 6B.

Further, the required number of the "fabricating unit cells 31A" are produced in the same manner as above.

The material for the gasket 3A is not limited to the ABS resin. Any other thermoplastic resin may be used if it has a resistance to the electrolyte solution (here, a resistance to sulfuric acid) and a heat resistance.

A pouring opening 4A for impregnating the pair of electrodes 1A with the electrolyte solution (i.e., the dilute water-solution of sulfuric acid) is formed to reach the opposing edge of the separator 2A within the gasket 3A in the next step, as shown in FIG. 6B.

Next, the required number of the "unit cells 31A", with which the above separator 2A, the pair of electrodes 1A, and the gasket 3A are unified, and the required number of the collectors 8A made of the butyl rubber are prepared. Then, they are stacked, as shown in FIG. 4.

In the capacitor according to the first embodiment of FIG. 4, it is assumed that the voltage applied to the whole capacitor is equally divided and allotted to each of the "basic cells 30A". Then, the necessary number of stacking is determined so that the allotted voltage per basic cell is 0.8 V.

Further, an epoxy adhesive is applied onto the bonding surfaces of the gasket 3A in the "fabricating unit cell 31A". Then, the stacking is made while placing the "unit cell 31A" and the collector 8A one upon the other. In other words, the stacking is made while sandwiching the collector 8A between the two "unit cells 31A".

At each ends on the positive- and negative-sides, the collector 8A having the Grafoil 9 on its outer surface are placed, and then, the positive-side end gasket frame 14A and the negative-side end gasket frame 15B, which are made of ABS resin, are bonded thereto.

Thereafter, while using a jig to press and hold the stacked structure at 25 kg/cm$^2$, the coated epoxy adhesive is cured in an adhesive-curing chamber. Then, on the exposed face of each of the Grafoils 9 in the stacked structure, the terminal plate 10 is placed. On the outsides of the terminal plates 10, the insulating rubber plates 11 and 12 for use as the spacers are placed. On the outside of the plates 12, the pressing plates 13 is placed.

While pressing and holding the entire assembly at 2 kg/cm$^2$, the four corners of the stacked structure are tightened by means of the bolts 16 and the nuts 17.

Finally, after evacuating the inside of each of the "basic cells 30A" to $10^{-2}$ Torr through the electrolyte-pouring opening 4A, the dilute solution of sulfuric acid at 30 wt % is poured thereinto. The opening 4A is then fused and sealed with the sealing plug 18, thereby completing the stacking process of the electric double-layer capacitor according to the first embodiment of FIG. 4.

With the electric double-layer capacitor according to the first embodiment of FIG. 4, the number of necessary components is reduced compared to that for the previously-explained, conventional electric double-layer capacitors. Therefore, the number of the necessary process steps (i.e., the time required for assembling the stacked structure) is reduced, resulting in an improved productivity.

For example, assuming that the process steps required for the assembling process in fabrication of the conventional electric double-layer capacitor is 100, the electric double-layer capacitor according to the first embodiment of FIG. 4 can be assembled with that of 55. This means that, for the overall fabrication process sequence of the electric double-layer capacitor, the value of 100 is reduced to 80.

In addition, in the capacitor according to the first embodiment, each of the electrodes 1A has a trapezoidal cross-section, and therefore, it is pressed against the separator 2A by the pressure from the gasket 3A applied to the peripheral portion of the electrode 1A. Therefore, compared to the conventional electric double-layer capacitors previously explained, the capacitor according to the first embodiment has a low contact resistance, and holds the contacting pressure over a long period of time. This means that the ESR is not only initially low but also is kept low over a long period of time.

In the capacitor according to the first embodiment of FIG. 4, any other material may be used for the collector 8A, if it has an electric conductivity and an acid resistance.

The terminal plate 10 may be made of any material, if it is an electrically conductive metal.

The insulating rubber plates 11 and 12 for use as the spacer need not always be made of rubber; they may be of any material with insulating properties, and if they have elasticity, it is more satisfactory.

The material for the pressing plate 13 is not critical, if it is a rigid plate, and the end gasket frames 14 and 15 may be made of any material, if it is a thermoplastic resin with resistance to acid and heat resistance.

The materials for the bolts 16 and the nuts 17 may be made any other material, if it is rigid.

SECOND EMBODIMENT

Figure 7:
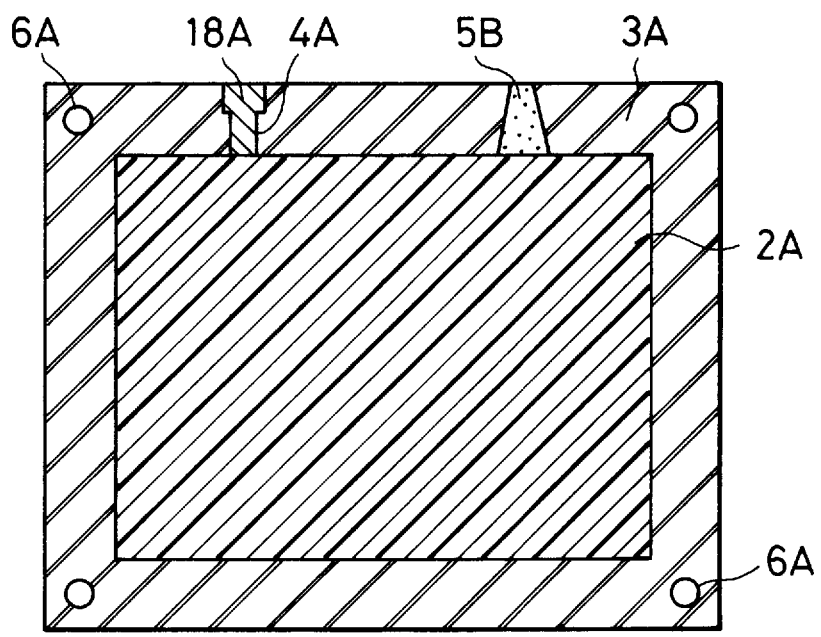
FIG. 7 is a lateral, cross-sectional view of an electric double-layer capacitor with the stacked structure of basic cells according to a second embodiment of the invention.

An electric double-layer capacitor according to a second embodiment is shown in FIG. 7.

The capacitor according to the second embodiment is the same in configuration as that according to the first embodiment, except that a venting plug 5B is embedded in the gasket 3A. Therefore, the explanation relating to the same configuration is omitted here by adding the same reference numerals to the corresponding elements in FIG. 7 for the sake of simplification of description.

The venting plug 5B is made of polytetrafluoroethylene, and is water-repellent and porous. In other words, the plug 5B allows a gas existing in the capacitor to permeate through the plug 5B, but allows no liquid to be passed. Therefore, an additional advantage that the gas generated in the capacitor can be released to the outside without leakage of the electrolyte solution.

The plug 5B is integrally molded at the same time when the separator 2A, the pair of electrodes 1A, and the gasket 3A are unified by injection molding of the thermoplastic resin 21.

To fabricate the stacking structure of the electric double-layer capacitor according to the second embodiment, the plug 5B is placed in the mold 20 together with the separator 2A and the pair of electrodes 1A. Thereafter, they are molded in the same injection-molding way as that of the first embodiment. Thus, the separator 2A, the pair of electrodes 1A, and the venting plug 5B are unified simultaneously with the gasket 3B.

Through this molding process, the molten ABS resin flows into the surface pores in the venting plug 5B made of polytetrafluoroethylene during the injection molding process. As a result, an additional advantage that the plug 5B is firmly bonded to the gasket 3B is obtained together with the same advantages as those of the first embodiment.

In the capacitor according to the second embodiment, instead of embedding the venting plug 5B in the gasket 3A during the injection molding process, a venting valve hole may be provided in the gasket 3B during the injection molding process and then, a circular sheet may be fused to seal the hole after the gasket molding.

It is preferred that the circular sheet is made of a polytetrafluoroethylene and has a diameter larger than that of the valve hole.

THIRD EMBODIMENT

An electric double-layer capacitor according to a third embodiment is shown in FIGS. 8, 9, and 10A to 10C.

The capacitor according to the third embodiment is the same in configuration as that according to the first embodiment, except for the following points (1) and (2). Therefore, the explanation relating to the same configuration is omitted here by adding the same reference numerals to the corresponding elements in FIG. 8 for the sake of simplification of description.

(1) A "functional base cell 30C", which is a unit for charge-storage function, is displaced from a "fabricating unit cell 31C", which is a unit for repetition in fabrication.

Each of the basic cells 30C is formed by a half of one of the unit cells 31C and a half of another one of the unit cells 31C that is stacked to be adjacent thereto.

(2) In response to the above difference (1), the wider surface of each of electrodes 1C, which has a trapezoidal cross-section, is contacted with a collector 8C.

Figure 8:
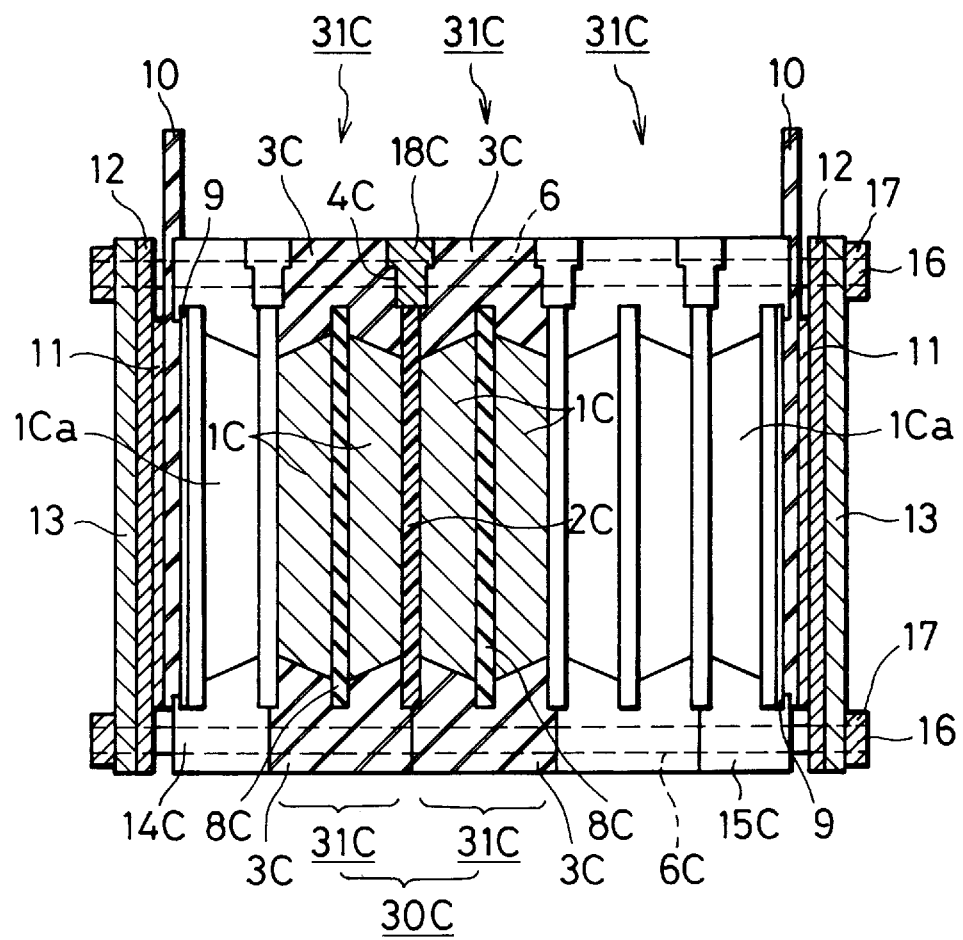
FIG. 8 is a vertical, cross-sectional view of an electric double-layer capacitor with the stacked structure of basic cells according to a third embodiment of the invention.

As shown in FIG. 8, each of the unit cells 31C is comprised of an insulating tubular gasket 3C having a tubular inner space, a sheet-like collector 8C fixed to the gasket 3C within the inner space of the gasket 3C in such a way that the inner space is divided into two parts, and a pair of polarizable electrodes 1C onto which a water solution of sulfuric acid as an electrolyte solution is absorbed. The pair of electrodes 1C are located in the two parts of the inner space of the gasket 3C.

Figure 9:
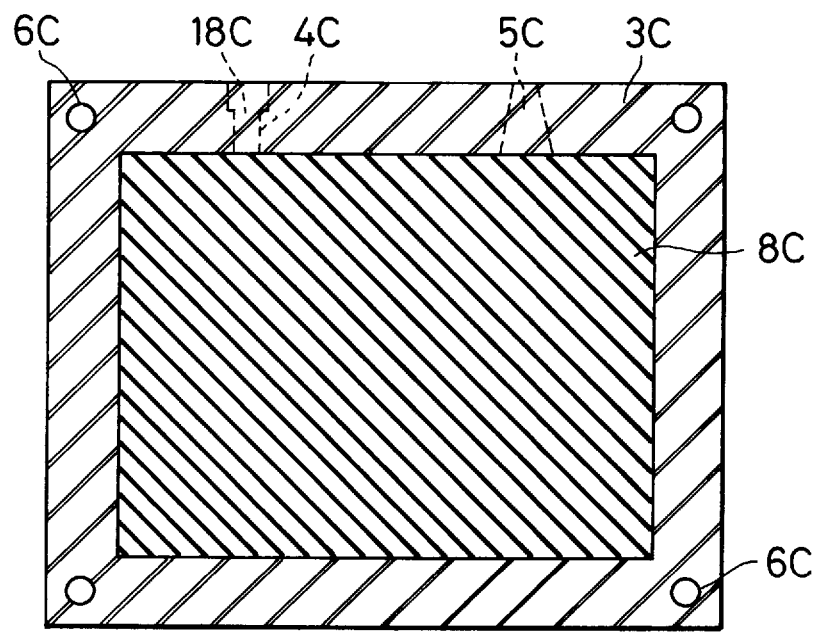
FIG. 9 is a lateral, cross-sectional view of the capacitor according to the third embodiment of FIG. 8.

As shown in FIG. 9, the gasket 3C has an opening 4C for supplying the electrolyte solution into the inside of the "unit cell 31A". The opening 4C is formed to penetrate the gasket 3C in a direction parallel to the gasket 3C, and is sealed with a plug 18C. The gasket 3C further has four circular holes 6C at its respective corners for inserting connection bolts 16 thereinto.

A collector 8C is located between the adjacent two electrodes 1C of the adjacent two unit cells 31C, and is commonly used for these two unit cells 31C.

The pair of polarizable electrodes 1C are made of a solid activated-carbon/polyacen composite material. The collector 8C is made of a conducive butyl rubber, the conductivity of which is given by mixing carbon powder and others into the butyl rubber material. The separator 2C is made of porous glass fibers used for a lead-acid battery, which is non-electron-conductive and ion-permeable.

A positive-side end gasket frame 14C and a negative-side end gasket frame 15C, which are made of ABS resin, are bonded onto the positive- and negative-side ends of the stacked structure comprised of the three unit cells 31C, respectively.

In the gasket frames 14C and 15C, two electrodes 1C a having the same configuration as that of the electrodes 1C and made of the same material as that of the electrodes 1C are placed, respectively. The electrodes 1Ca are contacted with the outermost separators 2C of the stacked structure, respectively.

A pair of external terminal plates 10 are attached onto the separators 2C at the positive- and negative-side ends of the stacked structure formed by the three unit cells 31C, respectively. The pair of terminal plates 10 are made of solder-plated aluminum, respectively. Since the outer most collectors 8C have Grafoils 9 bonded onto their outer surfaces, respectively, the terminal plates 10 are contacted with the corresponding Grafoils 9, respectively.

A pair of butyl-rubber plates 11 serving as spacers are attached onto the pair of external terminal plates 10 outside the gasket frames 14C and 15C, respectively. A pair of butyl-rubber plates 12 serving as spacers are attached onto the pair of plates 11, respectively. A pair of pressing plates 13 made of aluminum are attached onto the pair of butyl-rubber plates 12, respectively.

Connection bolts 16, which are made of a stainless steel, are inserted into the stacked holes of the stacked gaskets 3C, respectively. Nuts 17, which are made of a stainless steel, are engaged with the screws formed at the both ends of the bolts 16 to press the stacked unit cells 31C along the bolts 16 through the electrodes 1Ca and the collectors 8C located respectively in the gasket frames 14C and 15C, thereby holding or combining the three stacked unit cells 31C together.

Due to the applied pressure, the contact resistance across the adjacent unit cells 31C and that across the outermost unit cells 31C and the corresponding terminal plates 10 are kept low.

A venting plug 5C is made of polytetrafluoroethylene, and is water-repellent and porous. In other words, the plug 5C allows a gas existing in the capacitor to permeate through the plug 5C, but allows no liquid to be passed. Therefore, an additional advantage that the gas generated in the capacitor can be released to the outside without leakage of the electrolyte solution.

The plug 5C is integrally molded at the same time when the collector 8C, the pair of electrodes 1C, and the gasket 3C are unified by injection molding of the thermoplastic resin 21.

The electric double-layer capacitor according to the third embodiment of FIG. 8 is fabricated in the following way:

First, the pair of polarizable electrodes 1C are produced in the same way as that of the first embodiment. Next, the collector 8C is prepared.

Figure 10A:
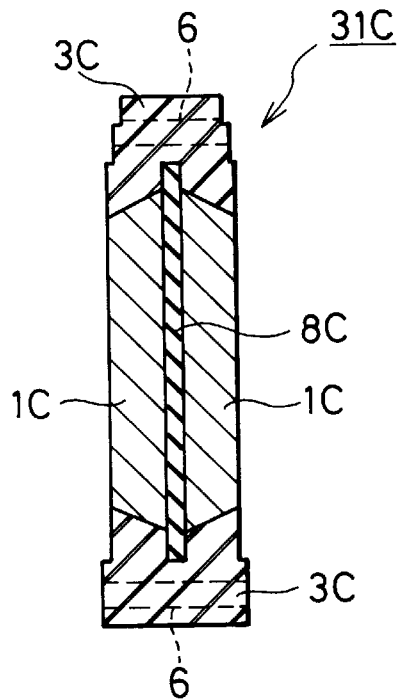
FIGS. 10A to 10C are vertical, cross-sectional views showing the fabrication process steps of the capacitor according to the third embodiment of FIG. 8, respectively.

Thereafter, in the similar way to the first embodiment of FIG. 6A, the pair of electrodes 1C and the collector 8C are placed in the central portion of the bottom half 20b of an injection mold 20 in such a way that the pair of electrodes 1C are located on each side of the collector 8C. The relatively wider surfaces of the pair of electrodes 1C are contacted with the opposing surfaces of the collector 8C, respectively, as shown in FIG. 10A.

The plug 5C is placed in the mold 20 together with the collector 5C and the pair of electrodes 1C.

Subsequently, the top half 20a of the mold 20 is placed on the bottom one 20b. Thus, the pair of electrodes 1C and the collector 8C, and the plug 5C are placed in the molding space of the mold 20.

Next, as shown in FIG. 6A, a molten ABS resin is injected into the molding space of the mold 20, thereby filling the peripheral part around the electrodes 1C. The injected molten ABS resin 21 is cured through a subsequent cooling process, thereby forming the gasket 3C surrounding the electrodes 1C and the collector 2C.

Thus, the "fabricating unit cell 31C", which is formed by four unified or combined components, i.e., the collector 8C, the two electrodes 1C, and the gasket 3C, is obtained as shown in FIG. 10A. At the same time, the venting plug 5C also is unified with the gasket 3B.

Through this molding process, the molten ABS resin flows into the surface pores in the venting plug 5C made of polytetrafluoroethylene during the injection molding process. As a result, an additional advantage that the plug 5C is firmly bonded to the gasket 3C is obtained together with the same advantages as those of the first embodiment.

Further, the required number of the "fabricating unit cells 31C" are produced in the same manner as above. As the porous separator 2C, separators made of glass fiber used for a lead-acid battery are prepared.

Figure 10B:
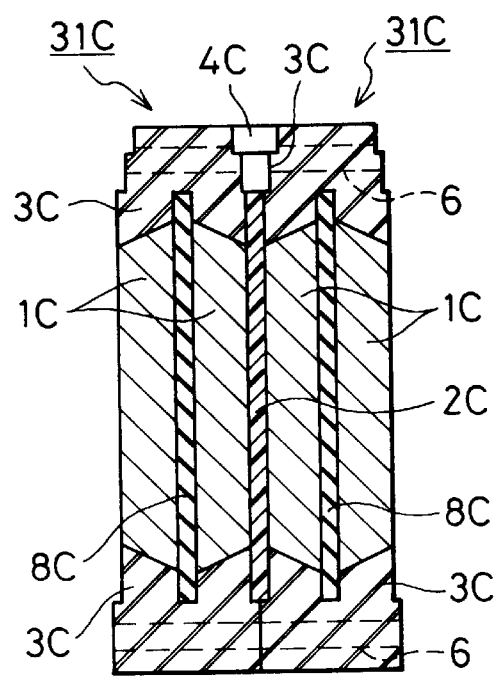

Next, the required number of the "unit cells 31C", with which the above collector 8C, the pair of electrodes 1C, and the gasket 3C are unified, and the required number of the separators 2C made of the butyl rubber are prepared. Then, they stacked, as shown in FIG. 10B. Thus, the pouring opening 4C for impregnating the pair of electrodes 1C with the electrolyte solution (i.e., the dilute water-solution of sulfuric acid) is formed between the adjacent gaskets 3C.

Further, an epoxy adhesive is applied onto the bonding surfaces of the gasket 3C in the "fabricating unit cell 31C". Then, the stacking is made while placing the "unit cell 31C" and the separator 2C one upon the other. In other words, the stacking is made while sandwiching the separator 2C between the two "unit cells 31C".

Figure 10C:
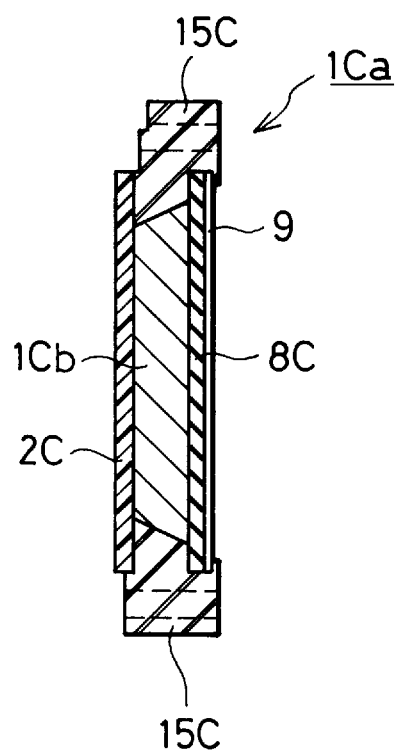

At each ends on the positive- and negative-sides, the collector 8C having the Grafoil 9 on its outer surface are placed. Then, the positive-side end gasket frame 14C and the negative-side end gasket frame 15C, which are made of ABS resin, are bonded thereto, resulting in the two subassemblies as shown in FIG. 10C.

Thereafter, while using a jig to press and hold the stacked structure at 25 kg/cm$^2$, the coated epoxy adhesive is cured in an adhesive-curing chamber. Then, on the exposed face of each of the Grafoils 9 in the stacked structure, the terminal plate 10 is placed. On the outsides of the terminal plates 10, the insulating rubber plates 11 and 12 for use as the spacers are placed. On the outsides of the plates 12, the pressing plates 13 is placed.

While pressing and holding the entire assembly at 2 kg/cm$^2$, the four corners of the structure are tightened by means of the bolts 16 and the nuts 17.

Finally, after evacuating the inside of each of the "basic cells 30C" to 10$^{-2}$ Torr through the electrolyte-pouring opening 4C, the dilute solution of sulfuric acid at 30 wt % is poured thereinto. The opening 4C is then fused and sealed with the sealing plug 18C, thereby completing the stacking process of the electric double-layer capacitor according to the third embodiment of FIG. 8.

With the electric double-layer capacitor according to the third embodiment of FIG. 8, the same advantages as those in the first embodiment can be obtained.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. An electric double-layer capacitor including at least one basic cell and a pair of external terminals electrically connected to the at least one basic cell;

each of said at least one basic cell comprising:
    (a) a tubular gasket having a tubular inner space and open ends;
    said gasket being made of an insulative material;
    (b) a pair of polarizable electrodes onto which an electrolyte solution is absorbed;
    said pair of electrodes being made of a solid activated-carbon;
    each of said pair of electrodes having an inner surface, an outer surface, and two end surfaces;
    (c) a sheet-like separator sandwiched between said pair of electrodes;
    said separator being made of a porous, non electron-conductive material;
    said separator having first and second surfaces contacting the inner surface of each of said pair of electrodes, respectively;
    (d) a pair of sheet-like collectors placed to close said open ends of said gasket;
    said pair of collectors being made of a conductive material;
    each of said pair of collectors having an inner surface contacting the outer surface of a respective one of said pair of electrodes;
    said pair of collectors being electrically connected to said pair of external terminals; and
    (e) said pair of polarizable electrode and said separator being placed in said inner space of said gasket;
    wherein said gasket is made of a thermoplastic resin and is formed by injection molding;
    and wherein said separator and said pair of electrodes are unified with said gasket;
    and wherein the unification of said separator and said pair of electrodes with said gasket is performed during the molding process of said gasket.

2. A capacitor as claimed in claim 1, wherein each of said end surfaces of said pair of electrodes are tapered such that said inner surface of each of said pair of electrodes which contacts said separator is wider than said outer surface thereof.

3. A capacitor as claimed in claim 1, wherein said gasket has an opening formed to communicate said inner space of said gasket with an outside thereof;
    and wherein said opening serves as a path for venting a gas existing in said inner space of said gasket;
    and wherein said opening is sealed by a porous plug that allows said gas to be vented through said plug and prevents said electrolyte solution in said inner space from leaking.

4. A capacitor as claimed in claim 3, wherein said plug is formed in said opening to thereby close said opening during the molding process of said gasket;
    and wherein said plug is unified with said gasket.

5. An electric double-layer capacitor including at least one basic cell and a pair of external terminals electrically connected to said at least one basic cell;
    each of said at least one basic cell being formed by a half of a first unit cell and a half of a second unit cell;
    each of said first and second unit cells comprising:
    (a) a tubular gasket having a tubular inner space and open ends;
    said gasket being made of an insulative material;
    (b) a sheet-like collector fixed to said gasket in said inner space of said gasket such that said inner space is divided into two parts;
    said collector being made of a conductive material;
    said collector having first and second surfaces located at opposite sides;
    (c) a pair of polarizable electrodes onto which an electrolyte solution is absorbed;
    said pair of electrodes being located in said two parts of said inner space;
    each of said pair of electrodes having an inner surface, an outer surface, and two end surfaces:
    said inner surface of each of said pair of electrodes contacting said first and second surfaces of said collector, respectively;
    said pair of electrodes being made of a solid activated-carbon; and
    (d) a sheet-like separator made of a porous, non-electron-conductive material;
    wherein said gasket is made of a thermoplastic resin and is formed by injection molding;
    and wherein said collector and said pair of electrodes are unified with said gasket;
    and wherein the unification of said collector and said pair of electrodes with said gasket is performed during the molding process of said gasket;
    and wherein said first and second unit cells are stacked to be connected in cascade to each other through said separator;
    and wherein said separator has first and second surfaces at opposite sides which contact opposing outer surfaces of one of said pair of electrodes in each of said first and second unit cells such that said separator is sandwiched between same.

6. A capacitor as claimed in claim 5, wherein each of said end surfaces of said pair of electrodes are tapered such that said inner surface of each of said pair of electrodes which contacts said collector is wider than said outer surfaces thereof.

7. A capacitor as claimed in claim 5, wherein said gasket has an opening formed to communicate said inner space of said gasket with an outside thereof;

and wherein said opening serves as a path for venting a gas existing in said inner space of said gasket;

and wherein said opening is sealed by a porous plug that allows said gas to be vented through said plug and prevents said electrolyte solution in said inner space from leaking.

8. A capacitor as claimed in claim 7, wherein said plug is formed in said opening to thereby close said opening during the molding process of said gasket;

and wherein said plug is unified with said gasket.

* * * * *